US011273765B2

(12) United States Patent
Lievaart et al.

(10) Patent No.: US 11,273,765 B2
(45) Date of Patent: Mar. 15, 2022

(54) FASTENING CONSTRUCTION, IN PARTICULAR FOR AN EXTERIOR VISION UNIT OF A MOTOR VEHICLE

(71) Applicant: MCI (Mirror Controls International) Netherlands B.V., Woerden (NL)

(72) Inventors: Rozemarijn Lievaart, Rotterdam (NL); Jannick Daniël Wijntjes, Rotterdam (NL); Christian Usher, Amstelveen (NL); Paulus Gerardus Maria Van Stiphout, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 58 days.

(21) Appl. No.: 16/757,004

(22) PCT Filed: Oct. 22, 2018

(86) PCT No.: PCT/NL2018/050692
§ 371 (c)(1),
(2) Date: Apr. 17, 2020

(87) PCT Pub. No.: WO2019/078724
PCT Pub. Date: Apr. 25, 2019

(65) Prior Publication Data
US 2020/0339037 A1    Oct. 29, 2020

(30) Foreign Application Priority Data

Oct. 20, 2017   (NL) .................................... 2019778

(51) Int. Cl.
*B60R 1/074*    (2006.01)
*B60R 1/076*    (2006.01)

(52) U.S. Cl.
CPC .............. *B60R 1/076* (2013.01); *B60R 1/074* (2013.01)

(58) Field of Classification Search
CPC ................................ B60R 1/074; B60R 1/076
(Continued)

(56) References Cited

U.S. PATENT DOCUMENTS 6,130,514 A * 10/2000 Oesterholt .............. B60R 1/074
318/438
7,171,726 B2 * 2/2007 Kleissen .................. B60R 1/074
16/235

(Continued)

FOREIGN PATENT DOCUMENTS

WO         03037680 A1    5/2003
WO      2017095224 A1    6/2017

*Primary Examiner* — Ricky D Shafer
(74) *Attorney, Agent, or Firm* — Volpe Koenig

(57) ABSTRACT

Fastening construction, in particular for an exterior vision unit of a motor vehicle, comprising a base part which can be fixedly connected with a vehicle, and a rotation part which is couplable with the base part and which in coupled condition forms a central shaft for pivotally bearing-mounting a housing of an exterior vision unit. The base part and the rotation part are provided with at least one cam and groove pair cooperating as a bayonet catch, such that in a first angular position of the rotation part with respect to the base part, the rotation part for the purpose of coupling can be displaced along a geometric axis to the base part to align the cam and groove pair for cooperation and the rotation part is pivotable about the geometric axis from the first angular position to a second angular position in which the cam and groove pair cooperate.

25 Claims, 10 Drawing Sheets

(58) Field of Classification Search
USPC .................................................. 359/841, 877
See application file for complete search history.

(56) References Cited

U.S. PATENT DOCUMENTS

| | | | | |
|---|---|---|---|---|
| 7,374,299 | B2* | 5/2008 | Brouwer | B60R 1/074 359/841 |
| 7,546,997 | B2* | 6/2009 | Van Stiphout | B60R 1/076 248/476 |
| 7,547,855 | B2* | 6/2009 | Brouwer | B60R 1/074 200/405 |
| 8,628,200 | B2* | 1/2014 | van Stiphout | B60R 1/076 359/872 |
| 9,308,866 | B2* | 4/2016 | Palvoelgyi | B60R 1/076 |
| 9,987,987 | B2* | 6/2018 | van Stiphout | B60R 1/074 |
| 10,562,453 | B2* | 2/2020 | van Stiphout | B60R 1/072 |
| 10,766,419 | B2* | 9/2020 | Bouaziz | B60R 1/076 |
| 2009/0086351 | A1 | 4/2009 | Sakata | |
| 2009/0147388 | A1* | 6/2009 | Mendoza | B60R 1/076 359/871 |
| 2012/0087026 | A1* | 4/2012 | Schuurmans | B60R 1/074 359/841 |
| 2021/0237650 | A1* | 8/2021 | Hoogenboom | B60R 1/12 |

* cited by examiner

Fig. 3.1
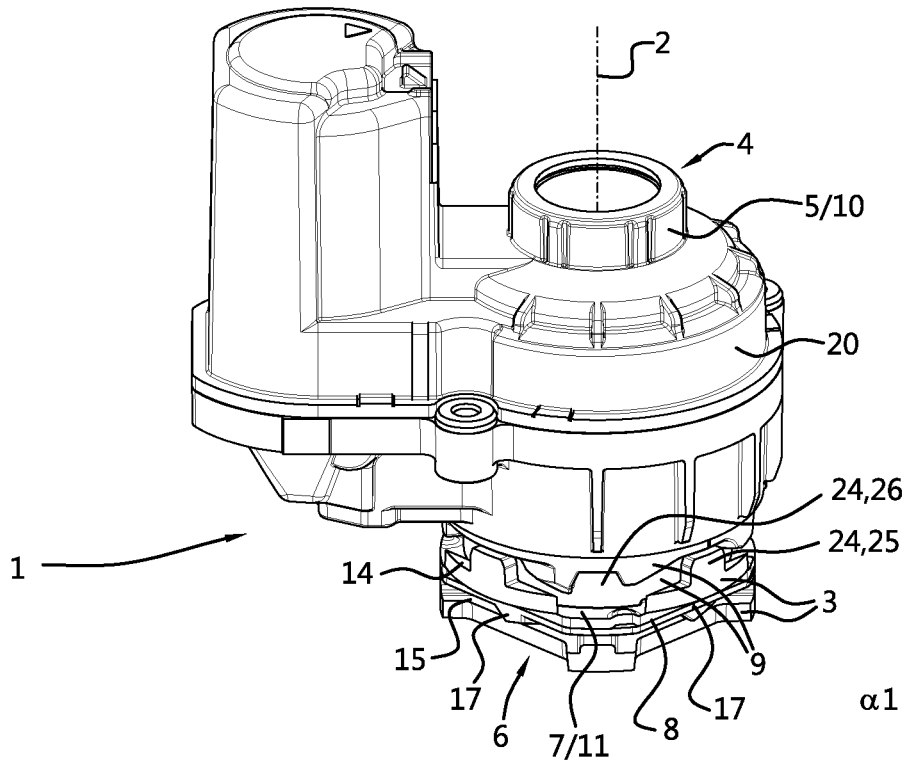
Fig. 3.2
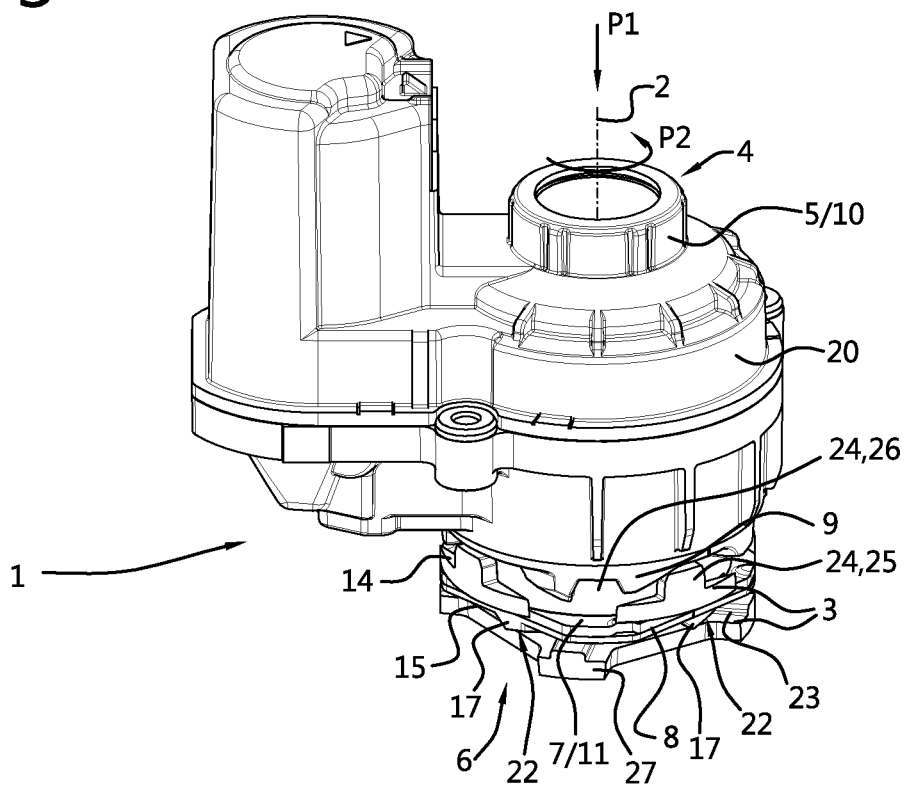

Fig. 3.3
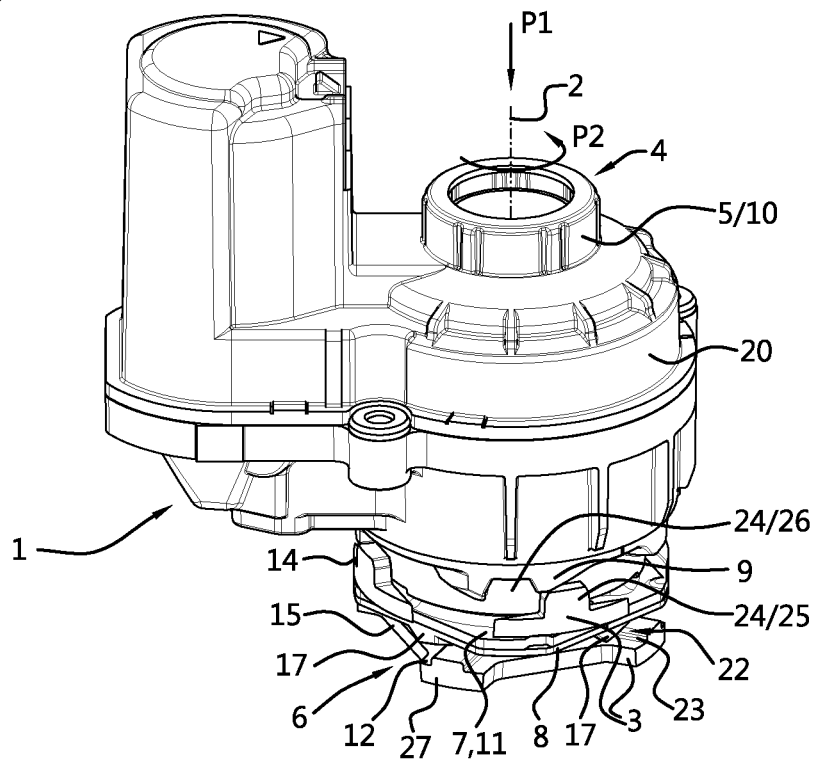
Fig. 3.4
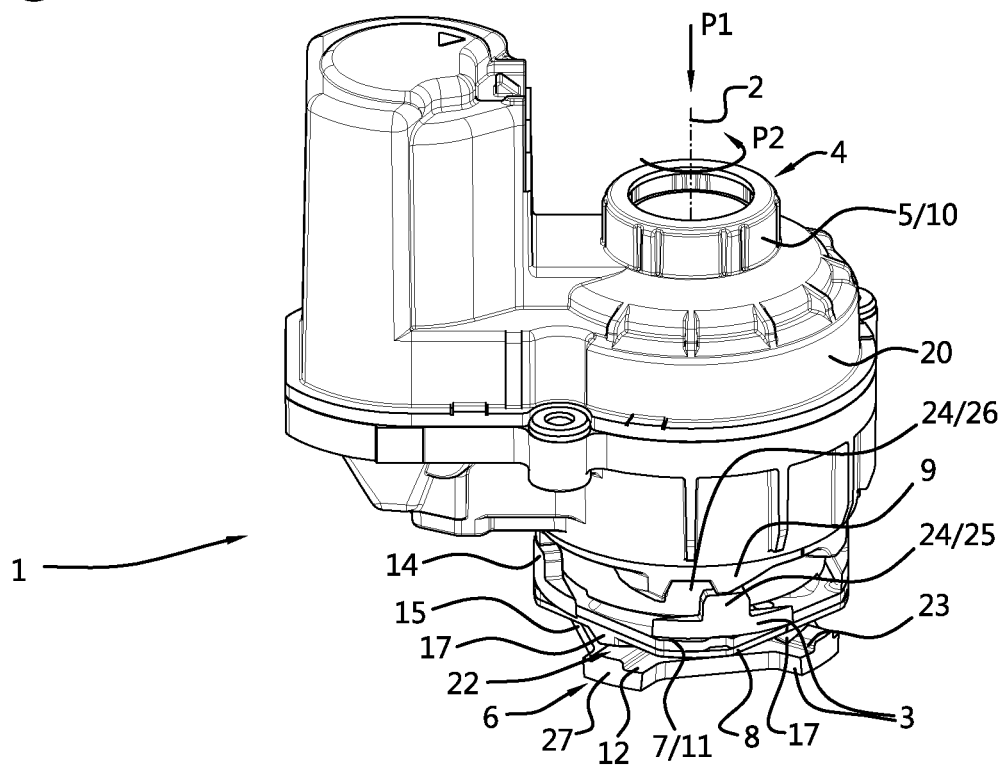

Fig. 3.5
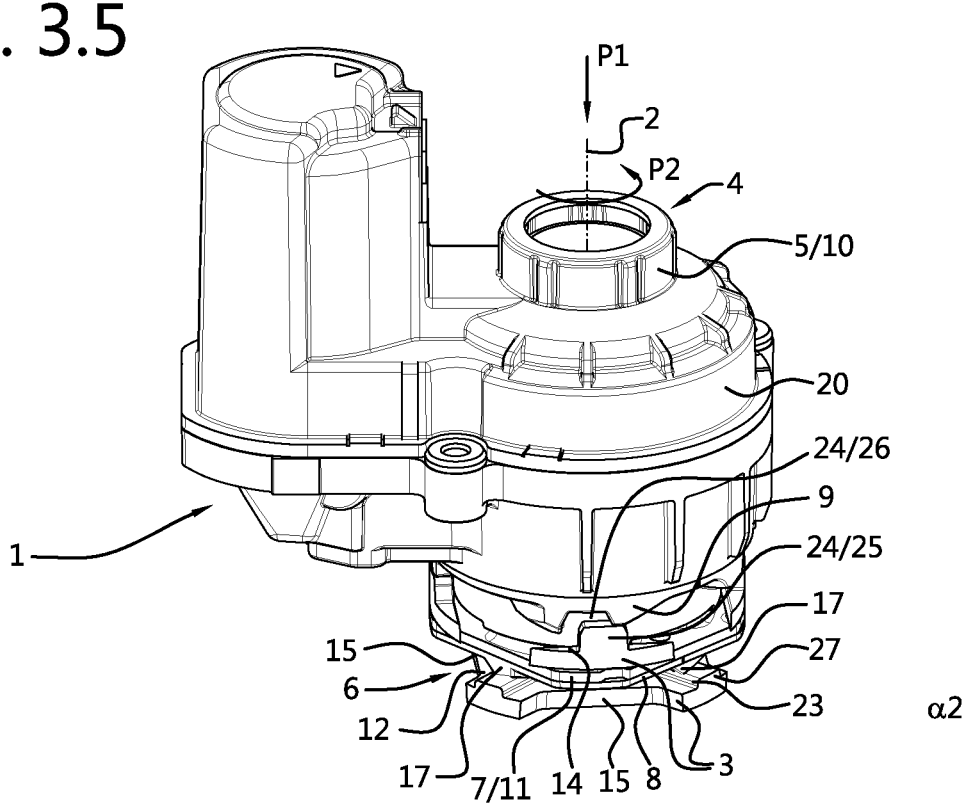
Fig. 3.6
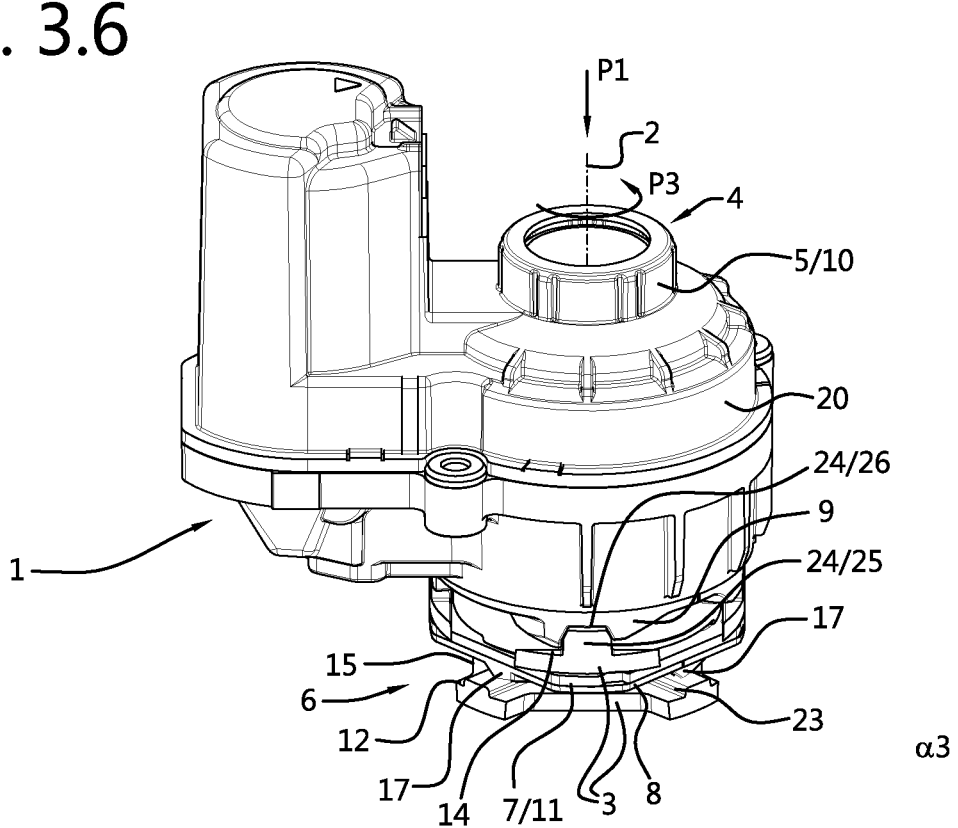

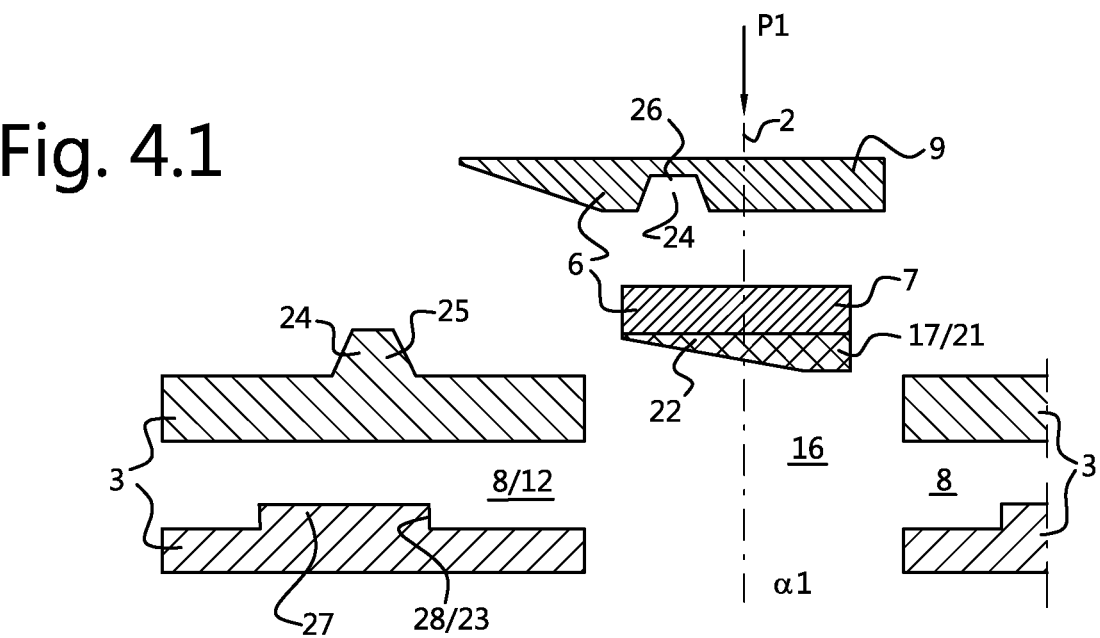
Fig. 4.1
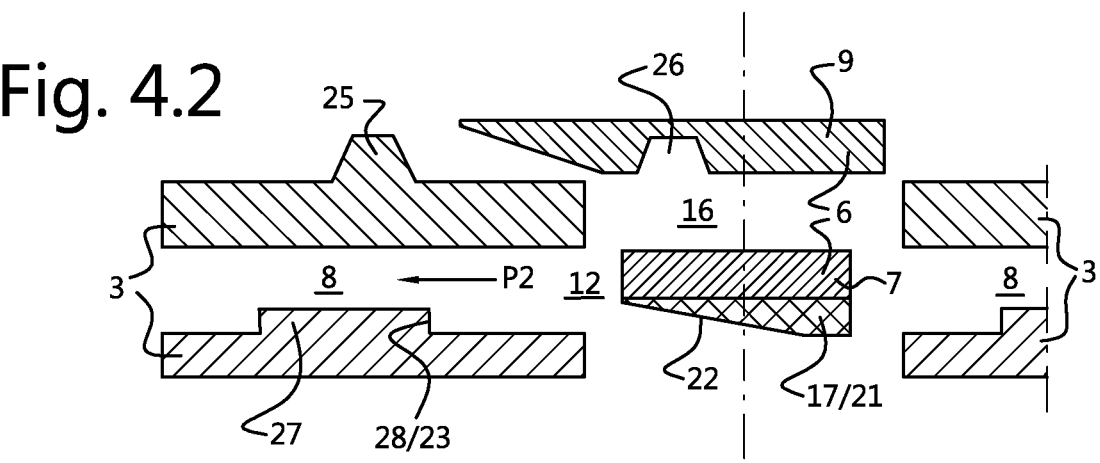
Fig. 4.2
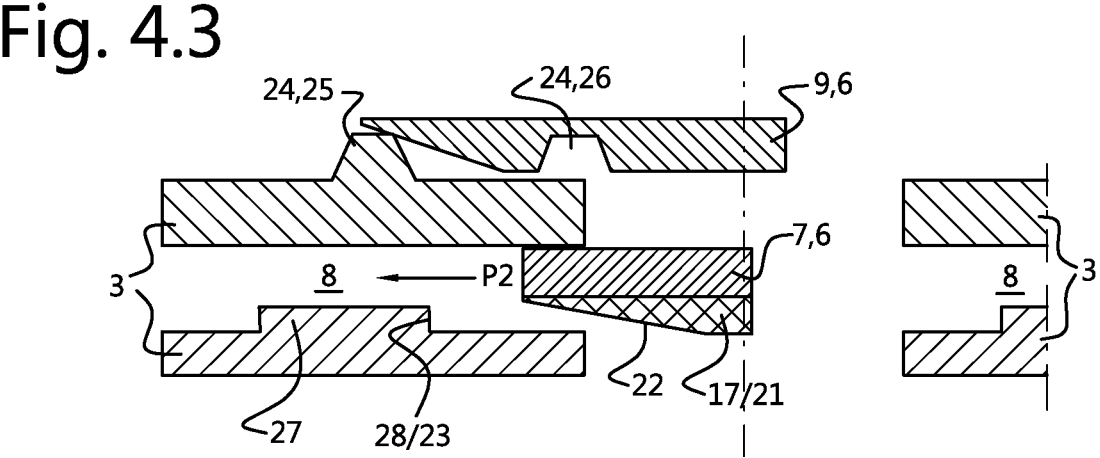
Fig. 4.3

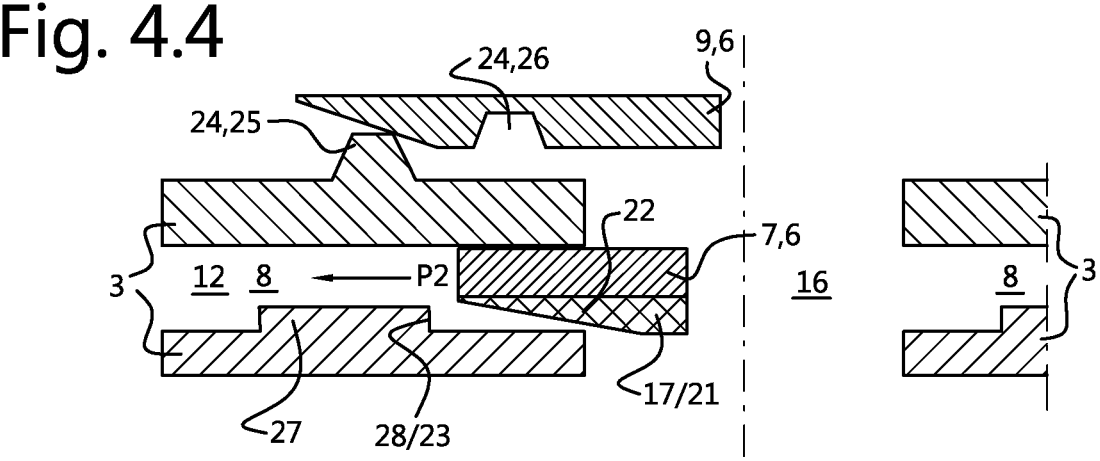
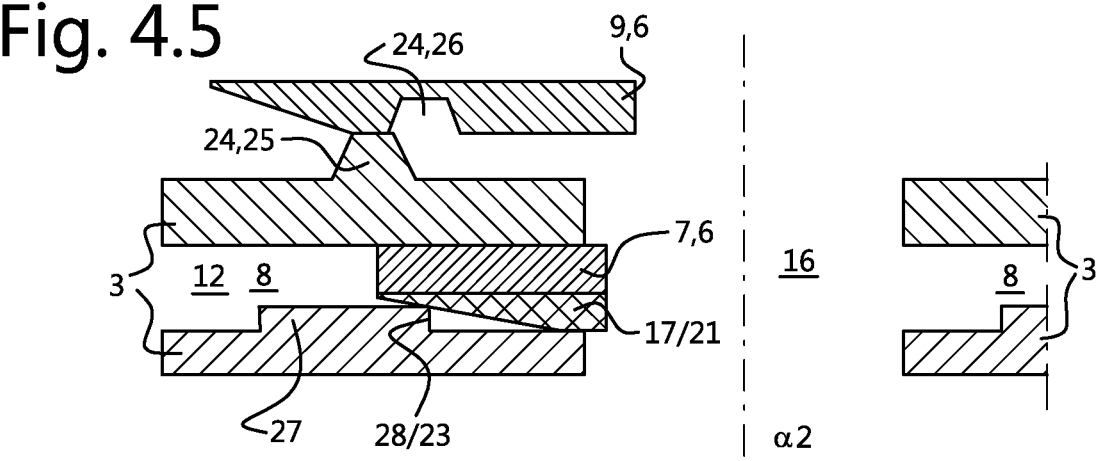
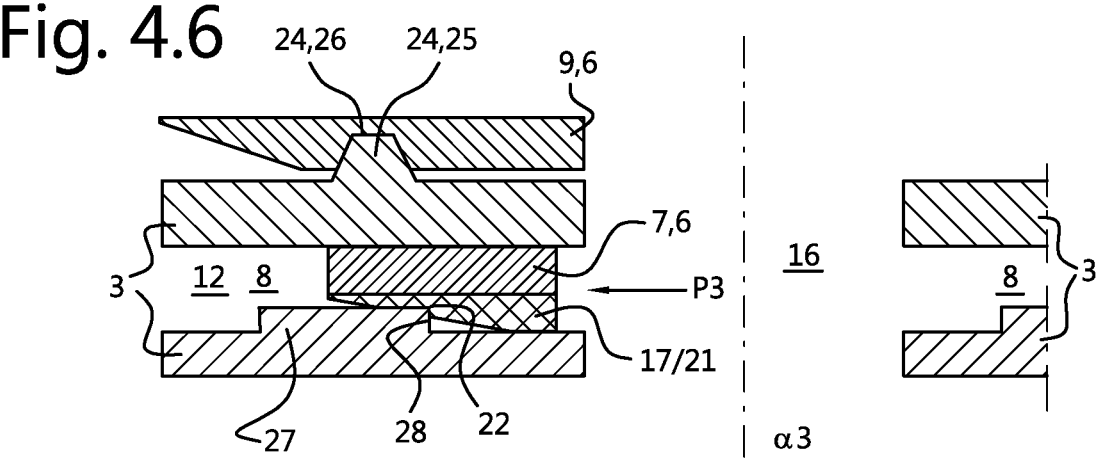

FASTENING CONSTRUCTION, IN PARTICULAR FOR AN EXTERIOR VISION UNIT OF A MOTOR VEHICLE

CROSS REFERENCE TO RELATED APPLICATIONS

This application is a 35 USC §371 National Stage application of International Patent Application No. PCT/NL2018/050692, which was filed Oct. 22, 2018, entitled "FASTENING CONSTRUCTION, IN PARTICULAR FOR AN EXTERIOR VISION UNIT OF A MOTOR VEHICLE" and Netherlands Patent Application No. 2019778, which was filed Oct. 20, 2017, and are incorporated herein by reference as if fully set forth.

The invention relates to a fastening construction, in particular for an exterior vision unit of a motor vehicle, comprising a base part which can be fixedly connected with a vehicle, and a rotation part which is couplable with the base part and which in coupled condition forms a central shaft for pivotally bearing-mounting a housing of an exterior vision unit.

Such a fastening construction is known from NL1019258 and is used for fastening an exterior vision unit, such as a housing provided with a frame and including an exterior mirror, camera and/or display, to a motor vehicle, in particular to the outside thereof.

It is customary to design exterior vision units of motor vehicles in such a manner that they can pivot towards the vehicle, for instance in case of a calamity, such as a collision, or to occupy less space in parked condition. The exterior vision units are then designed with a central shaft, which is fixedly connected with the vehicle and around which the housing of the exterior vision unit with the frame, exterior mirror and other provisions can rotate after a particular moment is exceeded.

Because exterior vision units are mostly assembled separately and are mounted to the car as an assembly, the central shaft is often designed as a part of the rotation part which can be coupled to a fixed part of the car, the base part.

This coupling can be carried out by connecting the rotation part by the central shaft with the base part using screws. The central shaft is then provided, for instance, with one or more holes which correspond with threaded holes in the base part. This solution has as an advantage that an operationally reliable connection can be made, but as a disadvantage that a large number of additional assembly operations are required, and that, moreover, per threaded hole an additional part is required: the screw.

It has been found that fitting the screws can lead to errors. In particular, it may be forgotten to fit screws and/or loose screws may remain behind in the exterior vision unit. In addition, the tightening force of screws is difficult to control. Also, the screws require additional mounting space, which may seriously hamper the freedom in the design of the exterior vision unit.

In NL1019258 it is has been proposed to provide the base part and the rotation part with at least one cam and groove pair cooperating as a bayonet catch, such that in a first angular position of the rotation part with respect to the base part the rotation part for the purpose of coupling can be displaced along a geometric axis to the base part to align the cam and groove pair for cooperation and that when the cam and groove pair have been aligned for cooperation the rotation part is pivotable about the geometric axis from the first angular position to a second angular position. In the second angular position, by cooperation of the cam and groove pair, the rotation part is locked with respect to the base part axially along the geometric axis. Due to the rotation part and the base part being furthermore provided with cooperating blocking means, in the second angular position the rotation part is locked against rotation relative to the base part about the geometric axis.

While this construction offers many advantages, it has been found difficult in practice to realize the axial lock in an operationally reliable manner free from play. In particular, it is relatively costly to manufacture the cam and groove pairs with low axial play and, also, axial play can increase in the course of the construction's life due to external factors such as vibrations and temperature fluctuations.

To counteract these disadvantages it has been proposed in NL2015897 to provide the bayonet catch with a cam and groove pair cooperating under wedging action in combination with a breakable coupling. By providing the bayonet catch with a cam and groove pair cooperating under wedging action, it is made possible, through the wedging effect upon rotation to the second position, to eliminate the axial play from the bayonet catch, and even to apply an axial bias. The rotation part can furthermore comprise a flange implemented as a separate part which is breakably rotation-coupled with the central shaft. By providing a breakable coupling between flange and rotation part, it can be ensured at the same time that, even at a relatively wide axial tolerance between cam and groove pair, during tightening a predetermined maximum tightening moment on the bayonet catch is not exceeded. Thus, with the fastening construction an axially low-play or even no-play lock-up can be realized cost-effectively and reliably. A disadvantage of this solution, however, is that this construction is relatively complex to implement in practice.

The invention contemplates an ameliorated fastening construction, especially one that is simpler to implement. In particular, the invention contemplates a fastening construction with a cam and groove pair cooperating as a bayonet catch, with which, whilst preserving the advantages mentioned, the disadvantages mentioned can be counteracted.

To that end, the invention provides a fastening construction, in particular for an exterior vision unit of a motor vehicle, comprising a base part which can be fixedly connected with a vehicle, and a rotation part which is couplable with the base part and which in coupled condition forms a central shaft for pivotally bearing-mounting a housing of an exterior vision unit, wherein the base part and the rotation part are provided with at least one cam and groove pair cooperating as a bayonet catch, such that in a first angular position of the rotation part with respect to the base part, the rotation part for the purpose of coupling can be displaced along a geometric axis to the base part to align the cam and groove pair for cooperation and the rotation part is pivotable about the geometric axis from the first angular position to a second angular position in which the cam and groove pair cooperate via a forcible filling element, so that the rotation part can rotate under forced displacement of material of the filling element from the second angular position about the geometric axis to a third angular position, and the rotation part is locked with respect to the base part axially along the geometric axis.

By providing the bayonet catch with a forcible filling element, the axial play can be eliminated from the bayonet catch and even an axial bias can be applied. By use of a forcible filling element, the axial space between cam and groove pair can be filled up with material of a first section of the filling element, and material of a second section of the filling element which is surplus in the axial space can upon tightening be displaced by forcing of the material. The forced displacement of the material can involve both elastic deformation and plastic deformation of the material. When at least a part of the material of the filling element is compressed in axial direction by, for example, the cam, it can contribute by elastic deformation to an axial bias. Another part of the material can then be pushed away by the cam in tangential and/or radial direction under plastic deformation. Thus, with the fastening construction an axially low-play or even no-play lock-up can be realized cost-effectively and reliably in a relatively simple manner.

By making the forcible filling element from a material deforming more easily with respect to the material of cam and/or groove, it can be achieved that a predetermined maximum tightening moment on the bayonet catch is not exceeded. Thus, for example, the cam and groove pair may be made from metal, while the forcible filling element is made from plastic, preferably a relatively tough and spreadable plastic, such as PA (Poly-Amide) with for example a glass bead filling or filled POM (Poly-Oxy-Methacrylate). Many materials are conceivable, not unknown to those skilled in the art.

The forcible filling element can be a separate part. As a separate part, the filling element can constitute, for example, a loose intermediate element, or, for example, it may be provided on the cam or groove, or be carried by the same. However, the forcible filling element may also be formed integrally with the cam or groove. The filling element is not a separate part then, but is part of the cam or groove.

By providing the forcible filling element with a rising contact surface, such as a bulging or inclined contact surface, it can be ensured that even at a relatively wide axial tolerance between cam and groove pair the axial play can be removed without a high forcing power being necessary.

When the rotation part and the base part are provided with cooperating blocking parts which block the rotation part in the third angular position from rotation about the geometric axis relative to the base part, it can be achieved that the rotation part and the base part can be locked against rotation relative to each other. As a result, during use a moment can be exerted on the rotation part without the locking action of the bayonet catch being influenced. In particular, this can prevent the bayonet catch being overloaded, or coming loose unintendedly.

The rotation part can furthermore comprise a flange implemented as a separate part, which is rotation-coupled with the central shaft.

When the housing of the exterior vision unit during connection cooperates with the flange in a moment-transmissive manner, in particular via a ring, arranged on the flange, with engaging elements which may be formed as cams, the exterior vision unit can be secured by rotating the housing.

When the flange is movable relative to the rotation part axially along the geometric axis, the cooperating blocking parts can be realized in a structurally simple manner.

When the flange during use is biased under spring action, in particular towards a bearing part extending substantially radially with respect to the geometric axis which carries a cam or groove of the bayonet catch, this allows the cooperating blocking parts to be energized in a structurally simple manner. For the purpose of generating spring action, it is then preferred to provide a spring, in particular a helical spring, arranged around the central shaft.

Further embodiments of the fastening construction are represented in the claims.

The invention also relates to an exterior vision unit for a motor vehicle, comprising a fastening construction.

The invention furthermore concerns a method for fastening an exterior vision unit to a motor vehicle, wherein a rotation part of an exterior vision unit around which a housing is pivotally bearing-mounted is connected via a bayonet catch with a base part which is mounted to the motor vehicle, comprising a first assembly step in which the rotation part is displaced along a geometric axis to the base part to align at least one cam and groove pair of the bayonet catch for cooperation, and wherein in a second assembly step the rotation part, by exertion of a tightening moment, is pivoted about the geometric axis from a first angular position to a second angular position in which cam and groove pair cooperate via a forcible filling element, and wherein the rotation part is rotated, under forced displacement of material of the filling element, from the second angular position about the geometric axis to a third angular position in which the rotation part is locked with respect to the base part axially along the geometric axis. The axial space between cam and groove pair can thereby be filled up with material of a first section of the filling element, and material of a second section of the filling element which is surplus in the axial space can upon tightening be displaced by forcing of the material.

The flange can then in the third angular position be nonrotatably coupled with the rotation part via a fixation coupling.

Further, the rotation part in the third angular position may be blocked via cooperating blocking parts from rotation about the geometric axis relative to the base part.

Also, the housing of the exterior vision unit may during connection cooperate moment-transmissively with the flange.

Regarding the disclosure in this application it is noted that the technical features of the fastening construction described in the independent claim can also be regarded as an invention independently or in combination with only one or more technical features from the main claim, the subclaims or the description. Also, the method steps of the method described in the independent method claim can be regarded as an invention independently or in combination with only one or more method steps from the main claim, the subclaims or the description.

The invention will be further elucidated on the basis of an exemplary embodiment of a fastening construction which is shown in drawings. In the drawings.

Figure 1:
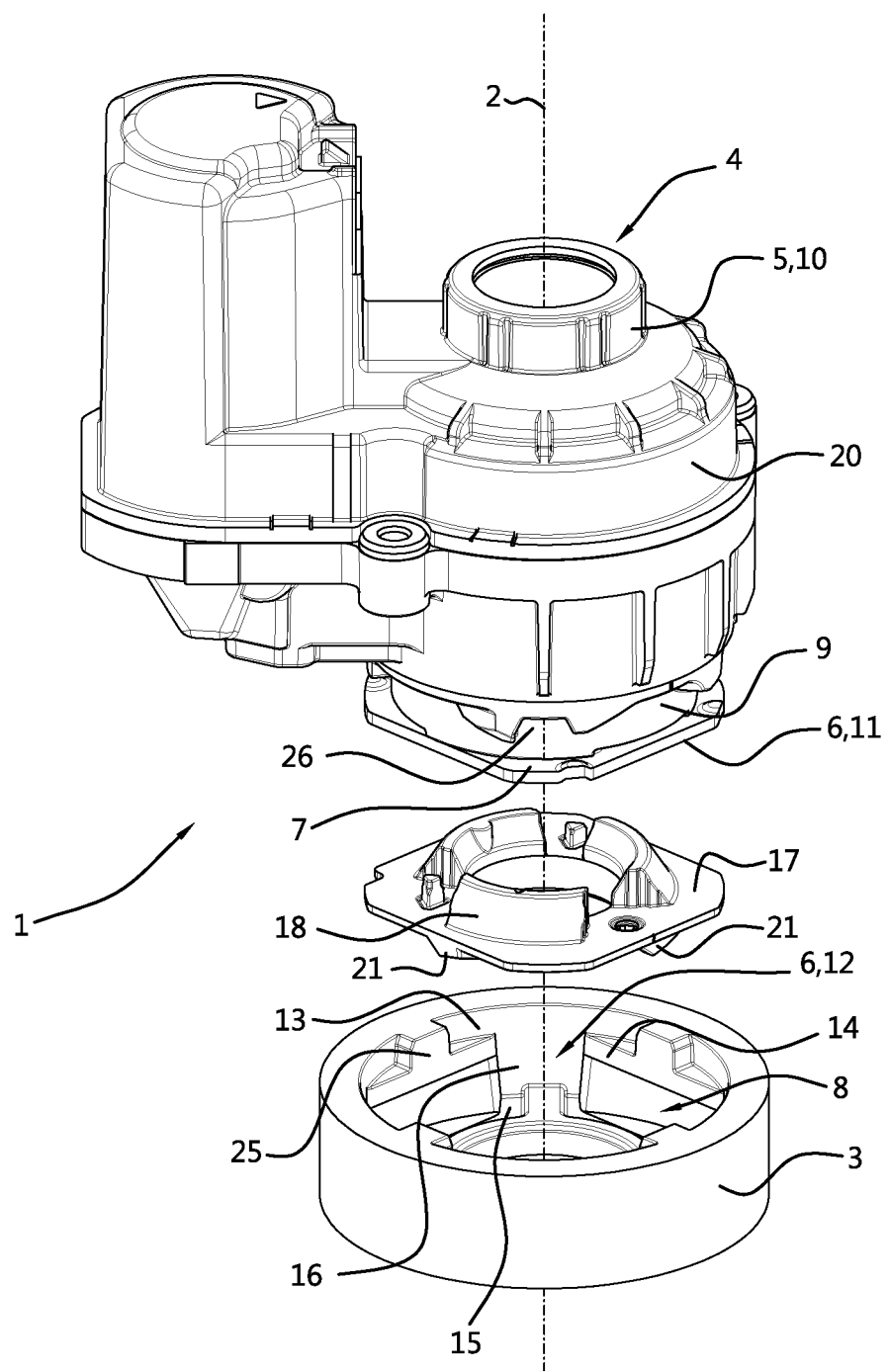
FIG. 1 shows a schematic perspective top plan view of a first embodiment of a fastening construction according to the invention in disassembled condition.
Figure 5:
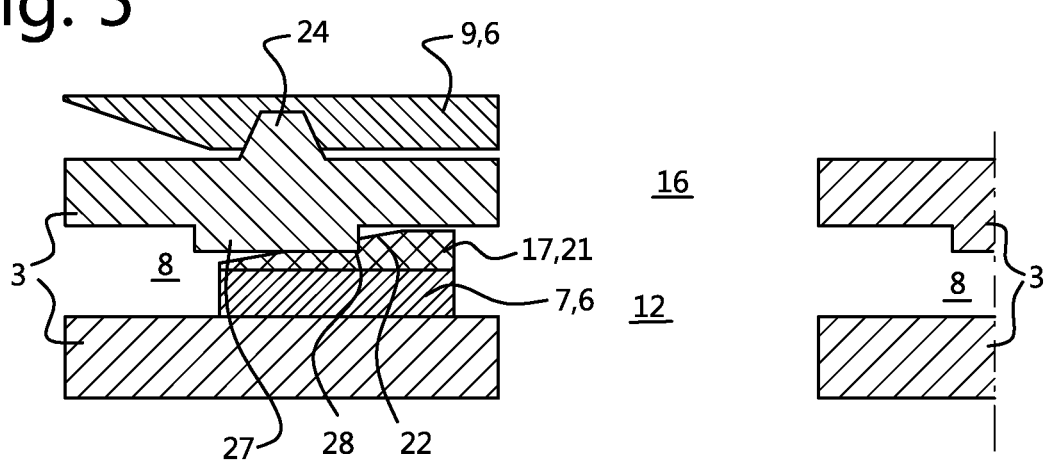
Figure 6:
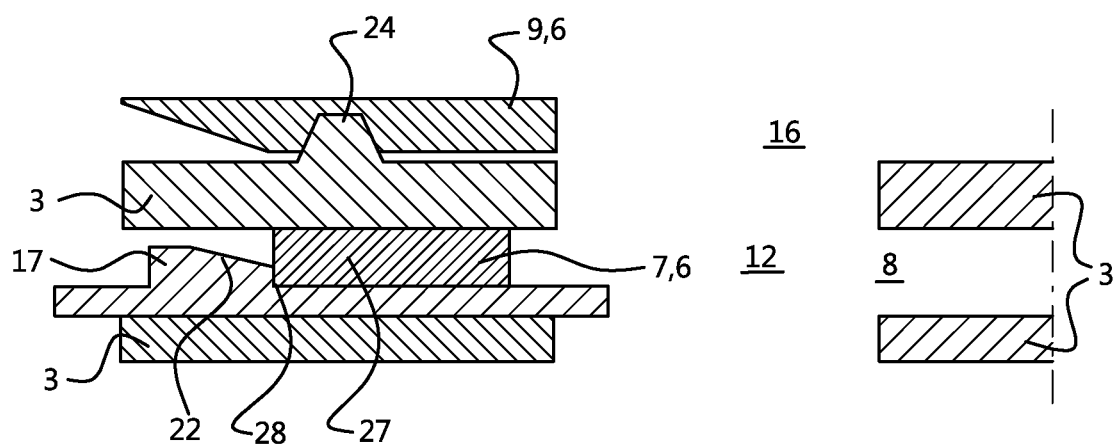
Figure 7A:
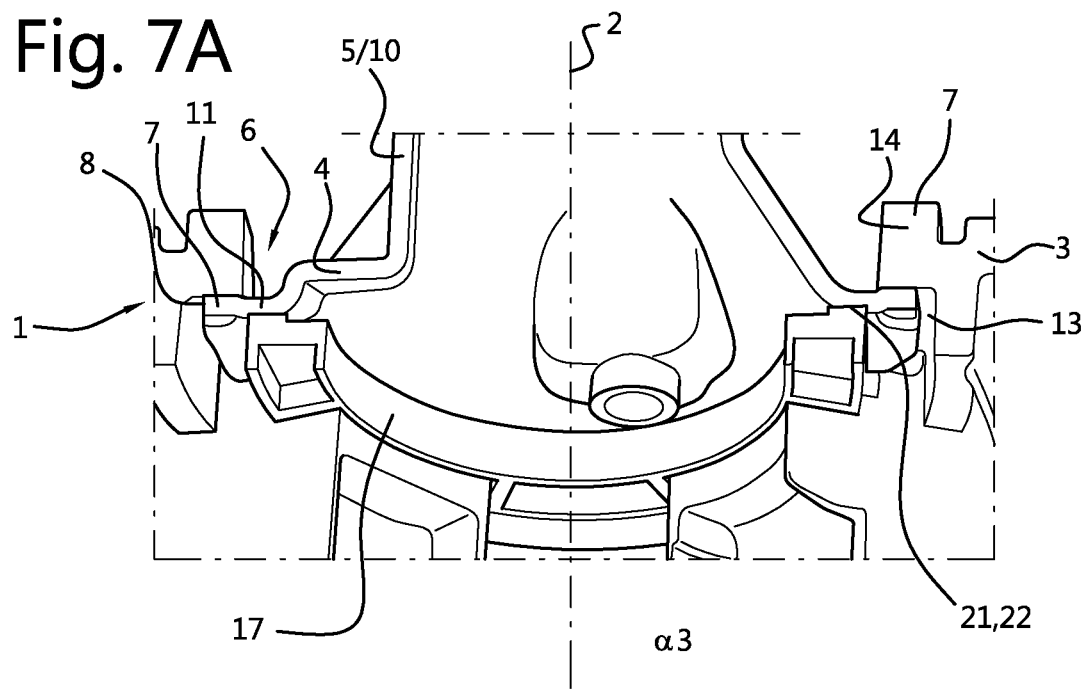
Figure 7B:
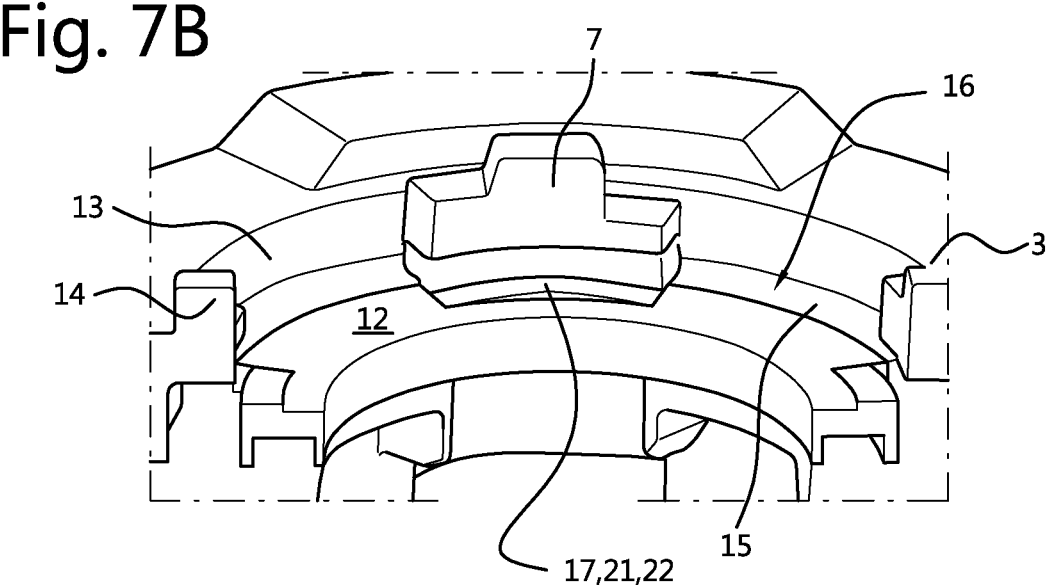
Figure 8A:
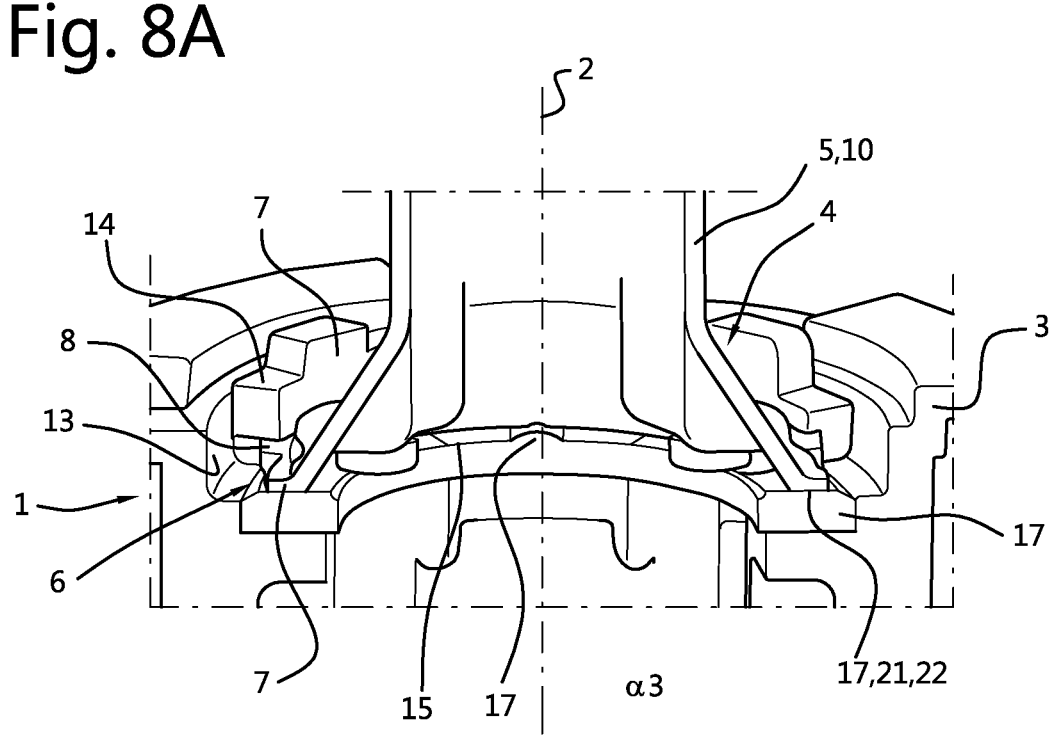
Figure 8B:
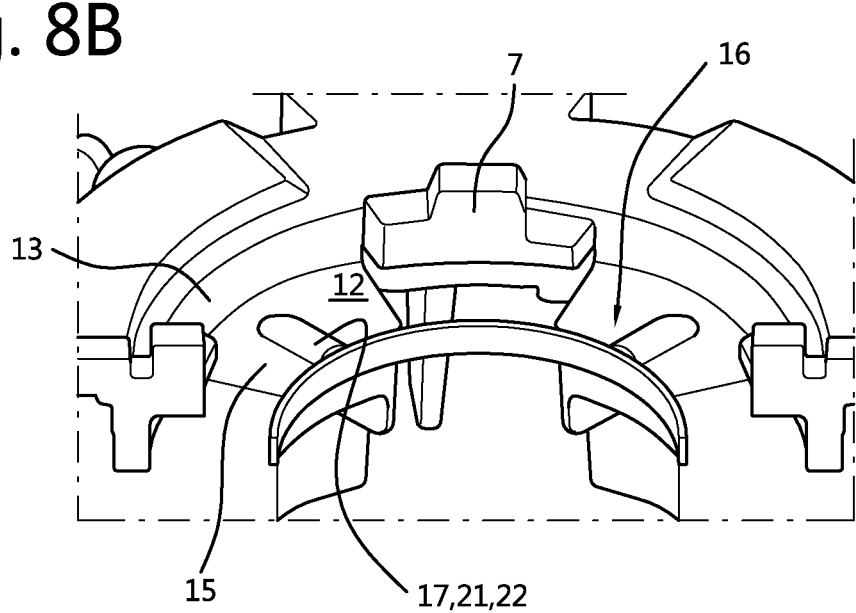

FIGS. 3.1 through 3.6 each show a schematic perspective view of the fastening construction of FIG. 1 in successive stages during connection, and FIGS. 4.1 through 4.6 each show a simplified side view corresponding in detail to what is shown in FIGS. 3.1 through FIG. 3.6;

FIG. 5 shows a variant on the first embodiment as shown in FIG. 4.6 wherein the forcible intermediate element is carried on the cam, and the stop extends downwards from an upper side of the groove;

FIG. 6 shows a further variant on the first embodiment as shown in FIG. 4.6 wherein the forcible intermediate element forms a separate component which is received, rotation-locked with the groove, between cam and groove;

FIG. 7a shows a sectioned schematic perspective bottom view of a second embodiment of a fastening construction according to the invention in mounted condition;

FIG. 7b shows a sectioned schematic perspective top plan view of the base part of the fastening construction of FIG. 7a with the forcible intermediate element therein;

FIG. 8a shows a sectioned schematic perspective top plan view of a third embodiment of a fastening construction according to the invention in mounted condition;

FIG. 8b shows a sectioned schematic perspective top plan view of the base part of the fastening construction of FIG. 8a with the forcible intermediate element therein.

In the figures, the same or corresponding parts are designated by the same reference numerals. It is noted that the figures are merely shown by way of exemplary embodiment and should not be regarded as limiting in any way.

FIG. 1 shows a fastening construction 1, in particular for an exterior vision unit of a motor vehicle. The construction and operation of an exterior vision unit are known to those skilled in the art, and will not be further elucidated here. For details regarding the construction and operation of an exterior vision unit, reference is made to NL1019258 in which an exterior vision unit is described, and the contents of which may be considered inserted herein by reference.

Figure 2:
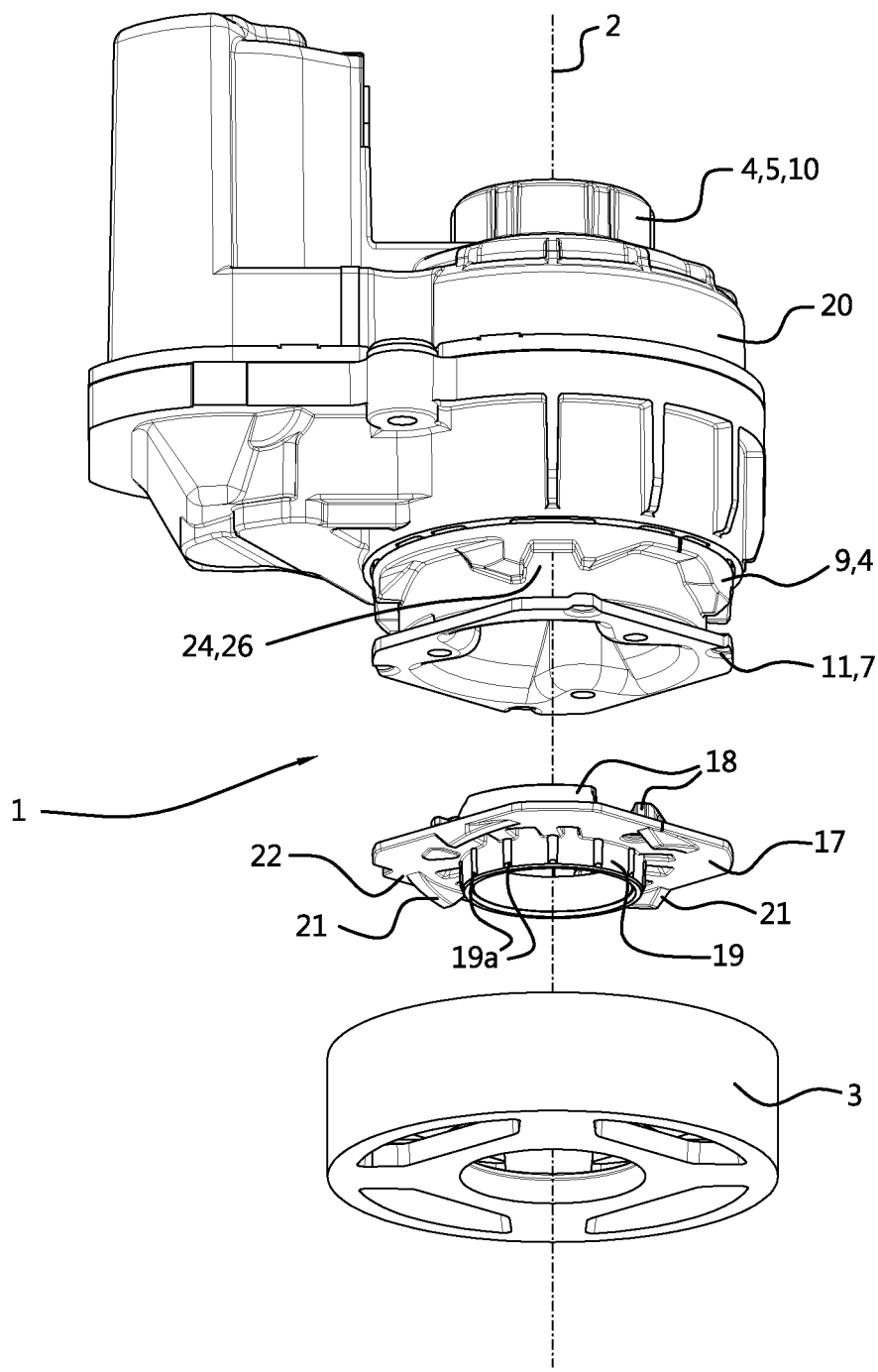
FIG. 2 shows a schematic perspective bottom view of the fastening construction of FIG. 1.

Referring to FIG. 1 and FIG. 2, a first embodiment of the fastening construction 1 comprises a base part 3 which can be fixedly connected with a vehicle, and a rotation part 4 which is couplable with the base part 3. The rotation part 4 in coupled condition forms a central shaft 5 for pivotally bearing-mounting a housing 20 of an exterior vision unit, not represented. The base part 3 and the rotation part 4 are provided with at least one cam and groove pair 7, 8 cooperating as a bayonet catch 6.

The rotation part 4 is provided with a main shaft part 10 extending along the geometric axis 2 and a bearing part 11 extending substantially radially with respect to the geometric axis 2 for bearing in a chamber 12 in the base part 3. In this exemplary embodiment, the bearing part 11 together with the chamber 12 embody the bayonet catch 6. The cam 7 in this example is implemented as a radially protruding corner point of the bearing part 11, here of plate-shaped design, and the groove 8 is formed under a projection 14 on the wall 13 of the chamber 12, between the lower edge of the projection 14 and the bottom 15 of the chamber 12. The bearing part 11 fits into the chamber 12 in the base part 3, which chamber 12 is provided with an access opening 16 corresponding to the bearing part 11.

As shown in FIGS. 3.1 and 4.1, in a first angular position α1 of the rotation part 4 relative to the base part 3, the rotation part 4, for the purpose of coupling, can be displaced in the direction of the arrow P1 along a geometric axis 2 to the base part 3 to align the cam and groove pair 7, 8 for cooperation. When the cam and groove pair 7, 8, as shown in FIGS. 3.2 and 4.2, are aligned for cooperation, the rotation part 4 is pivotable about the geometric axis 2 in the direction of arrow P2 from the first angular position α1 to a second angular position α2. The second angular position α2 is shown in FIGS. 3.5 and 4.5. In the second angular position the cam 7 of the bayonet catch 6 extends into the groove 8, so that axial movement in a direction opposite to the arrow P1 is counteracted.

In the second angular position α2 the cam and groove pair 7, 8 cooperate via a forcible filling element 17. The forcible filling element 17 in this example is implemented as a filling plate from plastics material which is relatively easily spreadable with respect to the metal of the cam and groove pair 7, 8. The forcible filling element 17 forms a separate component which is carried on an underside of the bearing part 11 of the rotation part 4. To that end, the forcible filling element 17 is provided with fastening elements 18. Also, the forcible filling element 17 in this embodiment is provided with a centering, preferably a self-centering, cylindrical bearing part 19. In FIG. 2, the self-centering bearing part 19 is furthermore provided with guide elements 19a in the form of axially extending cams. The cams extend free from play to a ring-shaped inner wall of the base part 3, and lock the cylindrical bearing part 19 by elastic and/or plastic deformation of the cams in radial direction, free from play. In alternative embodiments, the guide elements 19a in the form of axially extending cams may extend inwards, for example for cooperation with a ring-shaped outer wall of the base part 3. Many embodiments are possible. The forcible filling element 17 is furthermore provided with cams 21 having wedge-fashion rising contact surfaces 22, which cooperate with corresponding contact surfaces 23 of forcing elements 27 on the bottom 15 of the base part 3.

Referring to FIGS. 3.6 and 4.6, there is shown that the rotation part 4 moves under forced displacement of material of the filling element 17 from the second angular position α2 in the direction of arrow P3 about the geometric axis 2 to the third angular position α3, in which the rotation part 4 is locked relative to the base part 3 axially along the geometric axis 2. Movement in the direction of arrow P1 is now hindered as well, so that the cam and groove pair 7, 8 of the bayonet catch 6 are axially fixed. The axial space between cam and groove pair 7, 8 of the bayonet catch 6 is then filled up with material of a first section of the filling element 17, in particular the filling plate and a part of the cams 21. Material of a second section of the filling element 17 which is surplus in the axial space, in particular the tops of the cams 21, is displaced upon tightening from the second angular position α2 in the direction of arrow P3 to the third angular position α3 by forcing.

The rotation part 4 furthermore comprises a flange 9 implemented as a separate component. The flange 9 is rotation-coupled with the central shaft 5, but is axially slidable along the geometric axis 2. During use, the flange 9 is biased under spring action towards the bearing part 11. For generating spring action, there is provided a helical spring—not shown—arranged around the central shaft 5, which is restrained by the central shaft 5 and which presses on the flange 9. In a preferred embodiment the helical spring is under a bias. When, for the purpose of coupling, the rotation part 4, as shown in FIGS. 3.1 and 4.1, is moved in the direction of the arrow P1 along the geometric axis 2 towards the base part 3 to align the cam and groove pair 7, 8 for cooperation, the flange 9 is restrained by the base part 3, while the main shaft part 10 and the bearing part 11 move on axially. The spring is thereby compressed and when the cam and groove pair 7, 8 as shown in FIGS. 3.2 and 4.2 are aligned for cooperation, the driving part is under a strong spring action.

The rotation part 4 and the base part 3 are furthermore provided with cooperating blocking parts 24 which restrain the rotation part 4 in the third angular position α3 from rotation about the geometric axis 2 relative to the base part 3. The blocking parts 24 are implemented as cams 25 on the base part 3 which cooperate with corresponding recesses 26 in the flange 9. Referring to FIGS. 3.3-3.6 and FIGS. 4.3-4.6, there is shown that the flange 9 when rotating in the direction of the arrows P2 and P3, upon passing the second angular position is lifted up by the cam 25 against the action of the spring in a direction opposite to the direction of arrow P1, and thereupon, in the third angular position α3 under spring action moves in the direction of arrow P1 downward again in that the cam 25 is received in recess 26. Thus, the rotation part 4 in the third angular position α3 is locked against rotation relative to the base part 3. Thus, the coupling cam 25 of the cooperating blocking parts 24 in the third angular position α3 is received in the recess 26 in a rotation-locking manner, and the rotation part 4 in the third angular position α3 is blocked from rotation about the geometric axis 2 relative to the base part 3. This allows a moment to be exerted on the rotation part 4 without the locking action of the bayonet catch 6 being influenced, and can prevent the bayonet catch 6 becoming undone unintendedly.

In FIG. 5, analogously to FIG. 4.6, a variant on the first embodiment is shown where the forcible intermediate element 17 is borne on the cam 7 of the bayonet catch 6, and the forcing element 27 extends downwards from an upper side of the groove 8.

In FIG. 6 a further variant on the first embodiment is shown where the forcible intermediate element 17 forms a separate component which is received rotation-locked with the base part 3 in the chamber 12 between the cam 7 and groove 8.

In FIG. 7a and FIG. 7b a second embodiment of a fastening construction 1 according to the invention is shown. Here, the forcible intermediate element 17 is received as a ring in a rotation-locked manner in the bottom 15 of the chamber 12 of the base part 3. In this embodiment, the cams 21 are provided with convex contact surfaces 22, which cooperate with edges 28 of the cams 7 as forcing elements 27.

In FIGS. 8a and 8b, there is shown a comparable third embodiment of a fastening construction 1, where the forcible element 17 is implemented as a central ring with cams 21 set up in a cross, extending radially outwards and having convex contact surfaces 22 which cooperate with edges 28 of the cams 7 of the rotation part 4 of the bayonet catch 6.

The invention is not limited to the exemplary embodiments represented here. In particular, the fastening construction may be provided with a driving mechanism to adjust the housing electrically and the cam and groove pair of the bayonet catch may be implemented in a variety of ways. Also, with the fastening construction, an element other than a housing of a vision unit may be fastened, for example, a pivoting arm or a hub of a wheel, or a different object, for example a wall or frame.

These and other variations will be clear to one skilled in the art and are understood to be within the scope of the invention as represented in the following claims.

LIST OF REFERENCE SIGNS 1. fastening construction
2. geometric axis
3. base part
4. rotation part
5. central shaft
6. bayonet catch
7. cam
8. groove
9. flange
10. main shaft part
11. bearing part
12. chamber
13. wall
14. projection
15. bottom
16. access opening
17. forcible filling element
18. fastening element
19. bearing part
19a. guide element
20. housing
21. cam
22. contact surface
23. contact surface
24. blocking part
25. cam
26. recess
27. forcing element
28. edge
P1 Arrow
P2 Arrow
P3 Arrow
α1 first angular position
α2 second angular position
α3 third angular position

The invention claimed is:

1. A fastening construction for an exterior vision unit of a motor vehicle, comprising:
   a base part which can be fixedly connected with a vehicle, and
   a rotation part which is couplable with the base part, which in coupled condition forms a central shaft for pivotally bearing-mounting a housing of the exterior vision unit, wherein
   the base part and the rotation part are provided with at least one cam and groove pair cooperating as a bayonet catch, such that in a first angular position of the rotation part with respect to the base part, the rotation part can be displaced along a geometric axis to the base part to align the cam and groove pair for cooperation for coupling,
   the rotation part is pivotable about the geometric axis from the first angular position to a second angular position in which the cam and groove pair cooperate, wherein the cam and groove pair cooperate via a forcible filling element, so that the rotation part can rotate under forced displacement of material of the filling element from the second angular position about the geometric axis to a third angular position, and
   the rotation part is locked with respect to the base part axially along the geometric axis.

2. The fastening construction according to claim 1, wherein the forcible filling element is made from plastic.

3. The fastening construction according to claim 2, wherein the plastic is a tough and spreadable plastic.

4. The fastening construction according to claim 1, wherein the forcible filling element is a separate part.

5. The fastening construction according to claim 1, wherein the forcible filling element is provided with at least one guide element for centering the rotation part around the geometric axis with respect to the base part.

6. The fastening construction according to claim 1, wherein the forcible filling element is arranged on the cam or groove, or is carried thereby.

7. The fastening construction according to claim 1, wherein the forcible filling element is provided with a rising contact surface.

8. The fastening construction according to claim 7, wherein the rising contact surface is a bulging or inclined contact surface.

9. The fastening construction according to claim 1, wherein the rotation part and the base part are provided with cooperating blocking parts which block the rotation part in the third angular position against rotation about the geometric axis relative to the base part.

10. The fastening construction according to claim 9, wherein the cooperating blocking parts comprise a recess in the base part in which the coupling cam in the third angular position is received in a rotation-locking manner.

11. The fastening construction according to claim 1, wherein the rotation part furthermore comprises a flange implemented as a separate part which is rotation-coupled with the central shaft.

12. The fastening construction according to claim 11, wherein the housing of the exterior vision unit during connection cooperates with the flange in a moment-transmissive manner, with engaging elements, which are formed as cams.

13. The fastening construction according to claim 12, wherein the housing of the exterior vision unit during connection cooperates with the flange in a moment-transmissive manner via a ring, arranged on the flange.

14. The fastening construction according to claim 11, wherein the flange is movable relative to the rotation part axially along the geometric axis.

15. The fastening construction according to claim 11, wherein the flange during use is biased under spring action, which carries the cam or groove of the bayonet catch.

16. The fastening construction according to claim 15, wherein the flange during use is biased under spring action towards a bearing part extending substantially radially with respect to the geometric axis.

17. The fastening construction according to claim 1, wherein the rotation part is provided with a main shaft part extending along the geometric axis and a bearing part extending substantially radially with respect to the geometric axis for bearing in a chamber in the base part, wherein the bearing part together with the chamber forms the bayonet catch.

18. The fastening construction according to claim 1, wherein for the purpose of generating spring action, there is provided further comprising a spring configured to generate spring action arranged around the central shaft.

19. The fastening construction according to claim 18, wherein the spring is a helical spring.

20. An exterior vision unit for a motor vehicle comprising the fastening construction according to claim 1.

21. A method for fastening an exterior vision unit to a motor vehicle, wherein a rotation part of an exterior vision unit around which a housing is pivotally bearing-mounted is connected via a bayonet catch with a base part which is mounted to the motor vehicle, comprising a first assembly step in which the rotation part is displaced along a geometric axis to the base part to align at least one cam and groove pair of the bayonet catch for cooperation, and wherein in a second assembly step the rotation part, by exertion of a tightening moment around the geometric axis, is pivoted from a first angular position to a second angular position in which a cam and groove pair of the at least one cam and groove pair cooperate via a forcible filling element, and wherein the rotation part is rotated under forced displacement of material of the filling element from the second angular position around the geometric axis to a third angular position in which the rotation part is locked with respect to the base part axially along the geometric axis.

22. The method according to claim 21, wherein an axial space between the at least one cam and groove pair is filled up with material of a first section of the filling element, and material of a second section of the filling element which is surplus in the axial space is displaced upon tightening by forcing of the material.

23. The method according to claim 21, wherein the rotation part furthermore comprises a flange implemented as a separate part which is rotation-coupled with the central shaft, and the flange in the third angular position is nonrotatably coupled with the rotation part via a fixation coupling.

24. The method according to claim 21, wherein the rotation part in the third angular position is blocked via cooperating blocking parts from rotation about the geometrical axis relative to the base part.

25. The method according to claim 21, wherein the rotation part furthermore comprises a flange implemented as a separate part which is rotation-coupled with the central shaft, and the housing of the exterior vision unit during connection cooperates with the flange in a moment-transmissive manner.

* * * * *